United States Patent
Kono

(10) Patent No.: US 7,411,370 B2
(45) Date of Patent: Aug. 12, 2008

(54) VECTOR CONTROLLER OF INDUCTION MOTOR

(75) Inventor: Masaki Kono, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 70 days.

(21) Appl. No.: 11/632,052

(22) PCT Filed: Apr. 1, 2005

(86) PCT No.: PCT/JP2005/006507

§ 371 (c)(1),
(2), (4) Date: Jan. 10, 2007

(87) PCT Pub. No.: WO2006/033181

PCT Pub. Date: Mar. 30, 2006

(65) Prior Publication Data

US 2008/0048607 A1    Feb. 28, 2008

(30) Foreign Application Priority Data

Sep. 24, 2004   (JP)  ............................. 2004-277709

(51) Int. Cl.
    *H02P 21/08* (2006.01)
(52) U.S. Cl. .................. 318/802; 318/805; 318/799; 702/145
(58) Field of Classification Search ............. 318/802, 318/805, 807, 727, 799; 702/145
    See application file for complete search history.

(56) References Cited

U.S. PATENT DOCUMENTS 6,335,605 B1   1/2002   Negoro (Continued)

FOREIGN PATENT DOCUMENTS

JP   8-009697 A   1/1996

(Continued)

OTHER PUBLICATIONS

International Search Report dated Jun. 14, 2005.

*Primary Examiner*—Paul Ip
(74) *Attorney, Agent, or Firm*—Buchanan Ingersoll & Rooney PC

(57) ABSTRACT

Provided is a vector control apparatus for an induction motor which is capable of obtaining stable rotation in a short period of time for adjustment even at the time of low-speed operation by increasing the SN ratio of an output voltage to suppress the arithmetic error in the primary angular frequency arithmetic value based on a magnetic flux command value calculated from a circuit constant and an actual measurement of the induction motor even in the case where the rotation velocity of the induction motor is lower. The vector control apparatus includes a magnetic flux command value arithmetic section for selecting and outputting the magnetic flux command value on the basis of a torque command value that is externally input, the circuit constant of the induction motor, and the actual measurement related to the induction motor; and a vector controller for controlling an inverter device on the basis of the magnetic flux command value that is output from the magnetic flux command value arithmetic section and the circuit constant of the induction motor. The magnetic flux command value arithmetic section includes a magnetic flux command value back calculation arithmetic section for calculating a magnetic flux command arithmetic value so that a voltage that is applied to the induction motor becomes equal to or higher than a setting value corresponding to an unstable area.

7 Claims, 6 Drawing Sheets

U.S. PATENT DOCUMENTS

| | | |
|---|---|---|
| 6,518,722 B1 * | 2/2003 | Giuseppe .................... 318/727 |
| 6,570,358 B2 * | 5/2003 | Nakatsugawa et al. ...... 318/727 |
| 6,708,134 B2 * | 3/2004 | McGaughey et al. ........ 702/145 |
| 6,777,907 B2 * | 8/2004 | Ho .............................. 318/801 |
| 6,876,944 B2 * | 4/2005 | McGaughey et al. ........ 702/145 |
| 2003/0154041 A1 * | 8/2003 | McGaughey et al. .......... 702/75 |
| 2006/0138992 A1 * | 6/2006 | Yamamoto ................. 318/727 |
| 2007/0159131 A1 * | 7/2007 | Kitanaka .................... 318/807 |
| 2008/0007198 A1 * | 1/2008 | Kinpara et al. .............. 318/807 |

FOREIGN PATENT DOCUMENTS

| | | |
|---|---|---|
| JP | 2001-112299 A | 4/2001 |
| JP | 2001-169599 A | 6/2001 |
| JP | 2004-201357 A | 7/2004 |

* cited by examiner

VECTOR CONTROLLER OF INDUCTION MOTOR

TECHNICAL FIELD

The present invention relates to a velocity sensorless vector control apparatus for an induction motor, which is capable of remarkably reducing an unstable area at the time of low-speed operation even if rotation velocity detecting means such as a velocity sensor is not particularly used.

BACKGROUND ART

Vector control is performed by dividing a current of an AC electric motor into a magnetic field (i.e., magnetic flux) direction and a torque direction that is orthogonal to the magnetic field, thereby making it possible to control a magnetic flux current and a torque current, independently, and also to control a developed torque instantaneously as with a DC electric motor.

The vector control requires a velocity sensor in order to measure the magnetic flux. However, an electronic circuit is normally incorporated into the velocity sensor, and an operating temperature range of the electronic circuit is narrower than the operating temperature range of the AC electric motor to which the velocity sensor is attached.

Also, in the case where the electric motor uses both ends of a shaft, or in the case where the installation location of the electric motor is limited, the velocity sensor cannot be fitted to the electric motor. Also, even if the velocity sensor can be fitted to the electric motor, it is preferable to prevent the attachment of the velocity sensor in order to ensure the reliability of the facility since a coupling portion of the velocity sensor with the electric motor is vulnerable to shocks and a low level signal wiring is required.

Under the above circumstances, there has been proposed a vector control apparatus that conducts a velocity estimate on the basis of information other than velocity without using the velocity sensor.

However, at the time of low-speed operation, because the output voltage value is very small, an error occurs in the output angular frequency, and there exists an area where the rotation velocity is unstable.

In order to cope with the above problem, the conventional vector control apparatus for an induction motor includes a magnetic flux generator circuit having a table that sets a magnetic flux command value while referring to a magnetic flux command curve according to a primary angular frequency command in order to reduce the unstable area at the time of the low-speed operation (for example, refer to Patent Document 1).

In this case, a magnetic flux command curve is generated from the magnetic flux generator circuit to prevent an induced voltage torque axis component from becoming a given value or lower even at the time of the low-speed operation. Then, the SN ratio is increased to suppress the induced voltage torque axis component and an arithmetic error in the arithmetic value of the primary angular frequency to smaller values.

However, in conducting the vector control in the above method, when the induction motor that is controlled through the inverter device is changed, it is necessary to change the setting value of the magnetic flux generator circuit in each of the induction motors.

Patent Document 1: JP 08-009697 A

DISCLOSURE OF THE INVENTION

Problem to be Solved by the Invention

The conventional vector control apparatus for an induction motor has such a problem that an adjustment for avoiding the unstable area is difficult because it is necessary to change the setting value of the magnetic flux generator circuit and the table data of software which constitutes a control system in each of the induction motors when an induction motor is changed.

Means for Solving the Problem

A vector control apparatus for an induction motor according to the present invention is an apparatus for driving the induction motor through an inverter device, the apparatus includes: magnetic flux command value arithmetic means for selecting and outputting a magnetic flux command value on the basis of a torque command value that is calculated by a torque command value arithmetic section on the basis of an input signal from an external system, a circuit constant of the induction motor, and an actual measurement related to the induction motor; and vector control means for controlling the inverter device on the basis of the magnetic flux command value that is output from the magnetic flux command value arithmetic means and the circuit constant of the induction motor. In the vector control apparatus, the magnetic flux command value arithmetic means includes a magnetic flux command value back calculation arithmetic section for calculating a magnetic flux command arithmetic value so that a voltage that is applied to the induction motor becomes equal to or higher than a setting value corresponding to an unstable area.

Effects of the Invention

According to the vector control apparatus for an induction motor of the present invention, a magnetic flux command value is calculated back on the basis of a torque command value that is calculated by the torque command value arithmetic section on the basis of an input signal from the external system, a circuit constant of the induction motor, and an actual measurement related to the induction motor, and the SN ratio of the output voltage is increased, thereby making it possible to remarkably reduce the unstable area at the time of the low-speed operation even if the rotation velocity detecting means such as the velocity sensor is not particularly used.

Also, the magnetic flux command value is automatically calculated back so that the SN ratio of the output voltage can be set high at the time of the low-speed operation even when the induction motor is changed, thereby making it possible to avoid the unstable area. Thus, the present invention can be applied without conducting control adjustment.

BEST MODE FOR CARRYING OUT THE INVENTION

The present invention has been made to solve the above problems, and an object of the present invention is to provide a vector control apparatus for an induction motor which is capable of obtaining stable rotation in a short period of time for adjustment even at the time of low-speed operation by increasing the SN ratio of the output voltage according to the magnetic flux command value that is calculated on the basis of the circuit constant and the actual measurement of the induction motor to suppress the arithmetic error in the primary angular frequency arithmetic value to a smaller value even in the case where the rotation velocity of the induction motor is lower.

First Embodiment

Hereinafter, a description will be given of the respective embodiments of the present invention with reference to the accompanying drawings. The identical or corresponding parts in the respective drawings are denoted by the same reference symbols, and will be described.

Figure 1:
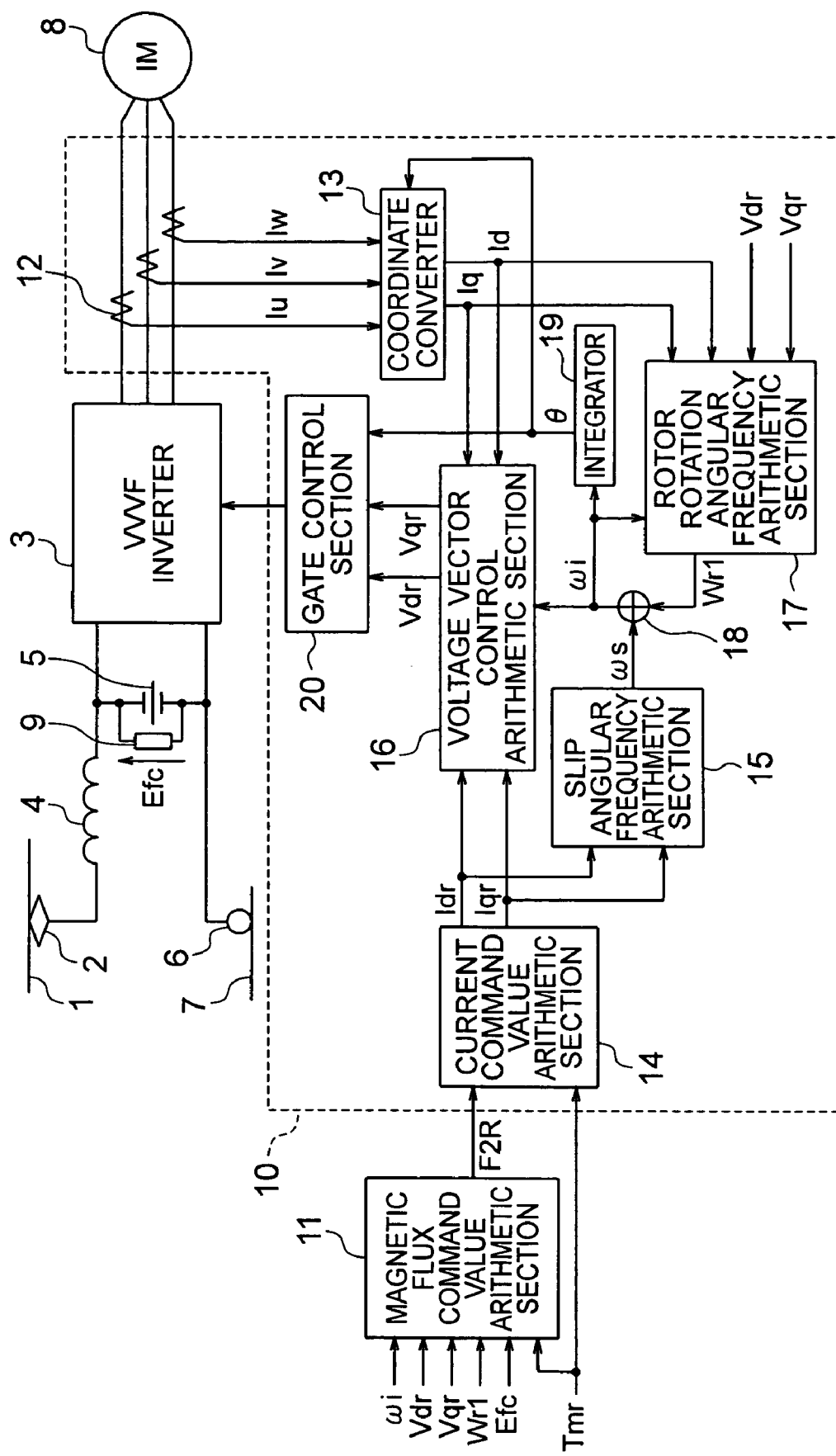
[FIG. 1] A block diagram showing a device configuration including a vector control apparatus for an induction motor according to a first embodiment of the present invention (a first embodiment)

FIG. 1 is a block diagram showing a device configuration including a vector control apparatus for an induction motor according to a first embodiment of the present invention.

In the first embodiment, a DC electric vehicle will be exemplified, but the present invention can be applied to an AC electric vehicle, likewise.

Referring to FIG. 1, a main circuit of an electric vehicle includes an overhead wire 1 that supplies a DC power to an electric vehicle, a pantograph 2 that collects the DC power from the overhead wire 1, a VVVF inverter 3 that converts the DC power that has been collected from the overhead wire 1 into an AC power of an arbitrary frequency, a DC reactor 4 and a filter capacitor 5 that are connected to a DC side of the VVVF inverter 3, wheels 6 that are connected to the minus side of the filter capacitor 5, rails 7 that ground one end of the capacitor 5 through the wheels 6, and an induction motor 8 that is connected to the AC side of the VVVF inverter 3.

In this example, the filter capacitor 5 is equipped with a voltage detector 9 that detects a capacitor voltage.

Also, referring to FIG. 1, the vector control apparatus includes vector control means 10 that controls the VVVF inverter 3, and a magnetic flux command value arithmetic means 11 that calculates the magnetic flux command value.

The vector control means 10 includes a current detector 12 that detects a primary current that flows in the induction motor 8, a coordinate converter 13 that converts the primary current which is detected by the current detector 12 into two axes of a rotating coordinate system constituted of a magnetic flux axis (i.e., d-axis) and a torque axis (i.e., q-axis) to output a d-axis current and a q-axis current, a current command value arithmetic section 14 that calculates a magnetic flux axis current command and a torque axis current command on the basis of the magnetic flux command value and the torque command value, a slip angular frequency arithmetic section 15 that calculates a slip angular frequency on the basis of the magnetic flux axis current command and the torque axis current command which are outputs of the current command value arithmetic section 14, a voltage vector control arithmetic section 16 that calculates a d-axis voltage command and a q-axis voltage command on the basis of the magnetic flux axis current command and the torque axis current command which are the outputs of the current command value arithmetic section 14 as well as an output angular frequency, a rotor rotation angular frequency arithmetic section 17 that calculates the rotor rotation angular frequency estimate value on the basis of the output angle frequency, the magnetic flux command value, the d-axis current, the q-axis current, the d-axis voltage command, and the q-axis voltage command, an adder 18 that adds the slip angular frequency to the rotor rotation angular frequency estimate value to calculate the output angular frequency, an integrator 19 that integrates the output angular frequency to calculate a phase angle, and a gate control section 20 that controls a gate of the VVVF inverter 3 on the basis of the phase angle, the d-axis voltage command, and the q-axis voltage command.

Figure 2:
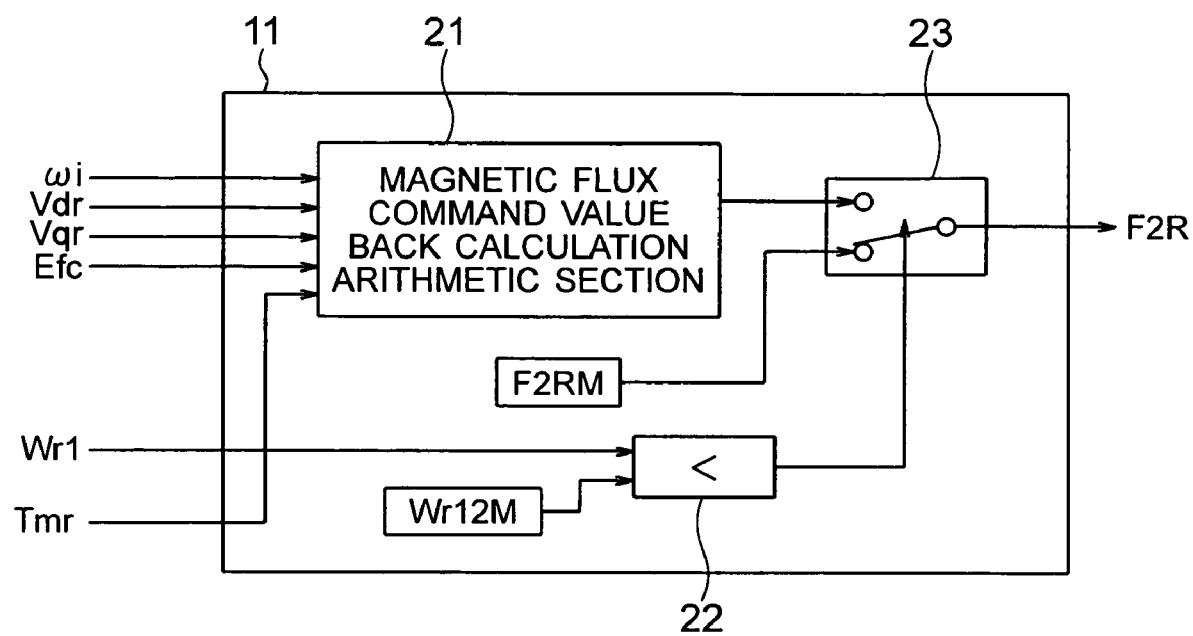
[FIG. 2] A block diagram showing magnetic flux command value arithmetic means in the vector control apparatus for an induction motor shown in FIG. 1 (the first embodiment).

FIG. 2 is a block diagram showing the magnetic flux command value arithmetic means 11 in the vector control apparatus for an induction motor shown in FIG. 1.

Referring to FIG. 2, the magnetic flux command value arithmetic means 11 includes a magnetic flux command value back calculation arithmetic section 21 that calculates a magnetic flux command value on the basis of a torque command value that is calculated by a torque command arithmetic section (not shown) on the basis of the d-axis voltage command, the q-axis voltage command, the output angular frequency, the filter capacitor voltage, and an input signal from the external system.

Also, the magnetic flux command value arithmetic means 11 includes a comparator 22 that compares a rotor rotation angular frequency and a switch 23 that switches over the magnetic flux command value according to the results of the comparator 22, which are first magnetic flux command switch means.

Further, the magnetic flux command value arithmetic means 11 is given a magnetic flux command reference value F2RM and a rotor rotation angular frequency set value Wr12M.

Figure 3:
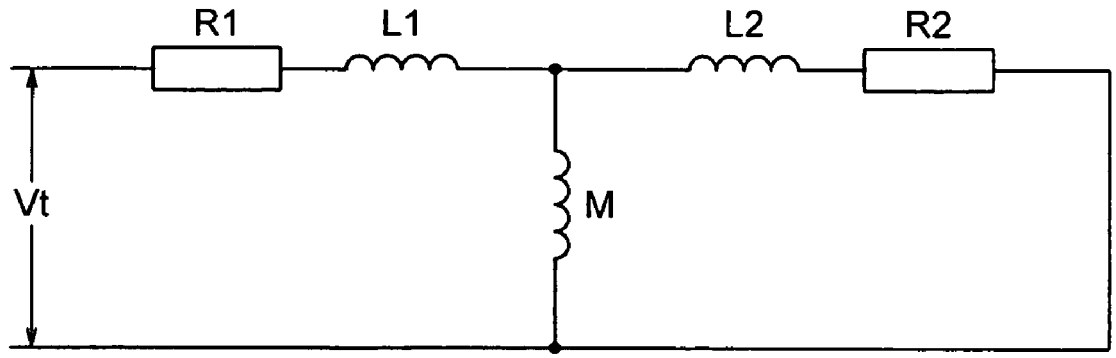
[FIG. 3] A circuit diagram showing an equivalent circuit of the induction motor shown in FIG. 1 (the first embodiment).

FIG. 3 is a circuit diagram showing an equivalent circuit of the induction motor shown in FIG. 1.

Referring to FIG. 3, a mutual inductance M, a primary inductance L1, a secondary inductance L2, a primary resistor R1, and a secondary resistor R2 which are circuit constants of the induction motor 8 are given the vector control means 10.

It is assumed that the pole logarithm of the induction motor 8 is P.

Figure 4:
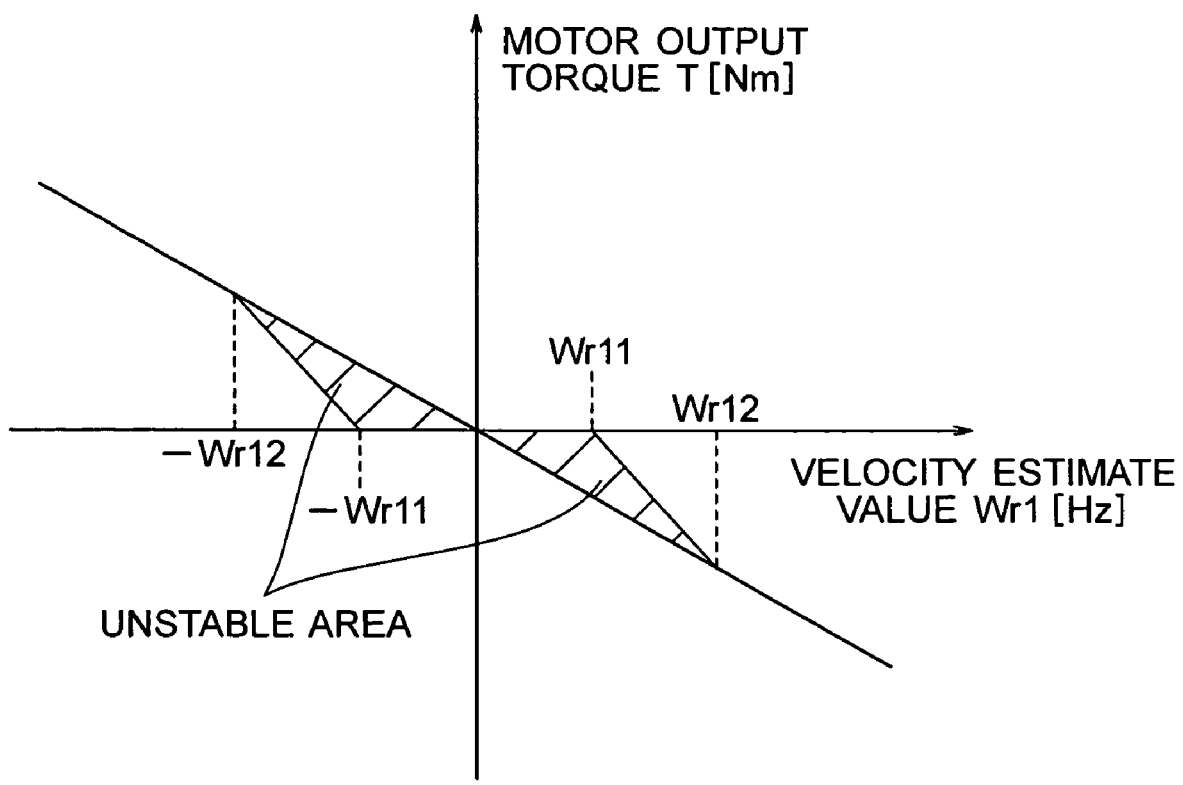
[FIG. 4] An explanatory diagram showing an unstable area in a velocity sensorless vector control apparatus for an induction motor, which is related to the first embodiment of the present invention (the first embodiment).

FIG. 4 is a graph showing an unstable area in a velocity sensorless vector control apparatus for an induction motor, which is related to the first embodiment of the present invention.

Referring to FIG. 4, hatched portions are unstable areas at the time of low-speed operation.

Figure 5:
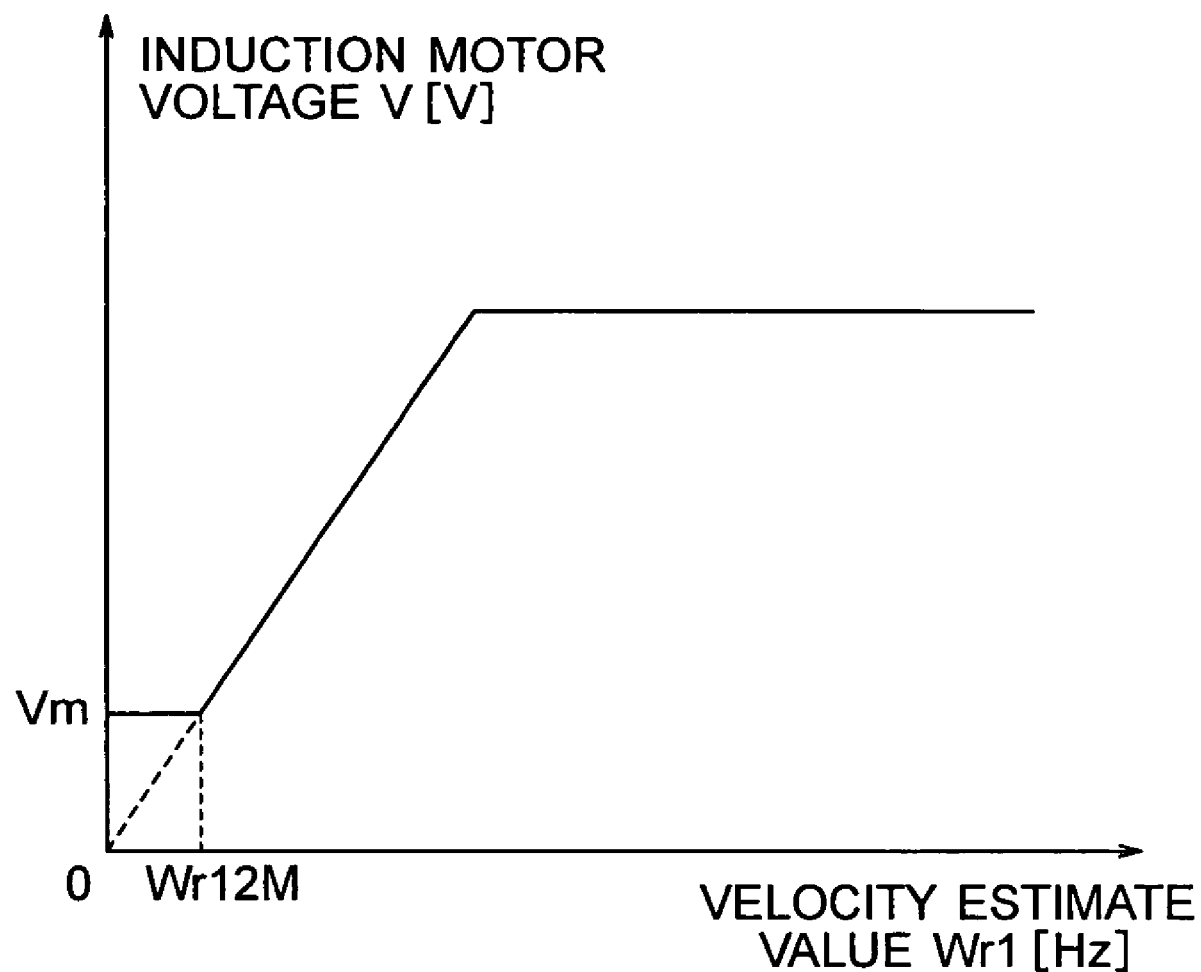
[FIG. 5] An explanatory diagram showing a relationship between a velocity and an induction motor voltage in the vector control apparatus for an induction motor according to the first embodiment of the present invention (the first embodiment).

FIG. 5 is a graph showing a relationship between a velocity and an induction motor voltage in the vector control apparatus for an induction motor according to the first embodiment of the present invention.

Hereinafter, a description will be given of the operation of the vector control apparatus for an induction motor 8 configured as described above.

First, the current detector 12 detects primary currents Iu, Iv, and Iw that flow in the induction motor 8. The detected primary currents Iu, Iv, and Iw are input to the coordinate converter 13, converted to two axes of the rotating coordinate system constituted of the magnetic flux axis (i.e., d-axis) and the torque axis (i.e., q-axis) on the basis of the following expression (1), and then output as the d-axis current Id and the q-axis current Iq.

[Eq. 1]

$$\begin{pmatrix} Iq \\ Id \end{pmatrix} = \sqrt{\frac{2}{3}} \begin{pmatrix} \cos\theta & \cos\left(\theta - \frac{2}{3}\pi\right) & \cos\left(\theta + \frac{2}{3}\pi\right) \\ \sin\theta & \sin\left(\theta - \frac{2}{3}\pi\right) & \sin\left(\theta + \frac{2}{3}\pi\right) \end{pmatrix} \cdot \begin{pmatrix} Iu \\ Iv \\ Iw \end{pmatrix} \quad (1)$$

Also, the current command value arithmetic section 14 inputs a magnetic flux command value F2R that is an output of the magnetic flux command value arithmetic section and a torque command value Tmr that is determined according to a notch command obtained from a driver's platform of the electric vehicle, and calculates a d-axis current command Idr and a q-axis current Iqr from the following expression (2).

[Eq. 2]

$$\begin{cases} Idr = \dfrac{F2R}{M} \\ Iqr = \dfrac{1}{P} \dfrac{L2 \times Tmr}{M \times F2R} \end{cases} \quad (2)$$

The slip angular frequency arithmetic section 15 calculates the slip angular frequency ωs to be given through the following expression (3) on the basis of the d-axis current command Idr and the q-axis current command Iqr which are the outputs from the current command value arithmetic section 14.

[Eq. 3]

$$\omega s = \frac{R2}{L2} \times \frac{Iqr}{Idr} \quad (3)$$

The slip angular frequency ωs that is calculated by the slip angular frequency arithmetic section 15 and the rotor rotation angle Wr1 that is calculated by the rotor rotation angular frequency arithmetic section 17 are added in the adder 18 into an output angular frequency ωi (i.e., inverter angular frequency) of the VVVF inverter 3.

In this example, a method of calculating the rotor rotation angular frequency Wr1 disclosed in, for example, JP 11-004599 A, can be used as the rotation angle velocity estimate means.

In the voltage vector control arithmetic section 16, the d-axis current command Idr, the q-axis current command Iqr, the d-axis current Id and the q-axis current Iq which are outputs of the coordinate converter 13, and the output angular frequency ωi are input to calculate the d-axis voltage command Vdr and the q-axis voltage command Vqr through the following expression (4).

[Eq. 4]

$$\begin{cases} Vdr = R1 \times Idr - \omega i \times \sigma \times L1 \times Iqr + \left(Kp + \dfrac{Ki}{g}\right) \times (Idr - Id) \\ Vqr = R1 \times Iqr + \omega i \times L1 \times Idr + \left(Kp + \dfrac{Ki}{g}\right) \times (Iqr - Iq) \end{cases} \quad (4)$$

where σ is a leak inductance (=1−(M×M/(L1×L2))), Kp is a current control proportion gain, Ki is a current control integer gain, and g is a Laplace operator.

Also, the output angular frequency ωi is input to the integer 19, and the integration value is output to the gate control section 20. An output of the integrator 19 is a phase angle θ between the a-axis of the rest coordinate system and the d-axis of the rotating coordinate system.

The gate control section 20 produces a gate signal that controls the VVVF inverter 3 on the basis of the d-axis voltage command Vdr and the q-axis voltage command Vqr that are outputs from the voltage command arithmetic section and the phase angle θ that is an output from the integrator 19.

The magnetic flux command value back calculation arithmetic section 21 that is disposed in the magnetic flux command value arithmetic means 11 calculates the magnetic flux command value F2RB to be given on the basis of the filter capacitor voltage Efc that is detected by the voltage detector 9, the d-axis voltage command Vdr and the q-axis voltage command Vqr that are outputs of the voltage vector control arithmetic section 16, and the output angular frequency ωi.

First, in a stationary state, the above expression (4) is represented by the following expression (5) because the d-axis current Id and the q-axis current Iq coincide with the d-axis current command Idr and the q-axis current command Iqr.

[Eq. 5]

$$\begin{cases} Vdr = R1 \times Idr - \omega i \times \sigma \times L1 \times Iqr \\ Vqr = R1 \times Iqr + \omega i \times L1 \times Idr \end{cases} \quad (5)$$

Also, the expression (3) is transformed into the following expression (6) by the expression (2).

[Eq. 6]

$$\omega s = \frac{R2}{L2} \times \frac{M}{F2R} \times Iqr \quad (6)$$

The secondary magnetic flux command value F2R and the torque command value Tmr can be represented by the following expressions (7) and (8) through the expression (2).

[Eq. 7]

$$F2R = M \times Idr \quad (7)$$

[Eq. 8]

$$Tmr = \frac{P}{L2} \times F2R \times Iqr = k \times F2R \times Iqr \left( \because k = \frac{P}{L2} \right) \quad (8)$$

The q-axis current command Iqr is transformed into the following expression (9) by the expression (4).

[Eq. 9]

$$Iqr = \frac{Tmr}{k \times F2R} \quad (9)$$

In this example, when it is assumed that the induction motor voltage is V, a relationship of the following expression (10) is satisfied by the d-axis voltage command Vdr and the q-axis voltage command Vqr.

[Eq. 10]

$$V=\sqrt{(Vdr)^2+(Vqr)^2} \therefore V^2=(Vdr)^2+(Vqr)^2 \quad (10)$$

The expression (10) is substituted for the expressions (5), (6), (7), and (8), thereby obtaining the following expression (11) with respect to the secondary magnetic flux command value F2R.

[Eq. 11]

$$F2R = \sqrt{\frac{-\left(\frac{2R1\cdot \omega i \cdot Tmr}{P} - V\right) + \sqrt{\left(\frac{2R1\cdot \omega i \cdot Tmr}{P} - V\right)^2 - 4\left(\frac{R1^2+(\omega i - L1)^2}{M^2}\right)\left(\frac{R1^2+(\omega i \cdot L1 \cdot \sigma)^2}{k^2}\right)Tmr^2}}{2\frac{R1^2+(\omega i - L1)^2}{M^2}}} \quad (11)$$

The circuit constants (i.e., R1, L1, M, L2, and P) of the induction motor 8, the output angular frequency ωi, the induction motor voltage V, and the torque command value Tmr are input by using the expression (11), thereby making it possible to uniquely determine the magnetic flux command value F2R.

Also, a relationship between the induction motor voltage V and the filter capacitor voltage Efc is represented by the following expression (12).

[Eq. 12]

$$V = \frac{\sqrt{6}}{\pi} Efc \times a \quad (12)$$

In the expression (12), "a" is a value called "modulation factor" or "voltage utilization factor".

Also, the expression (12) is substituted for the expression (11) with the result that the expression (11) is represented by the following expression (13).

[Eq. 13]

$$F2R = \sqrt{\frac{-\left(\frac{2R1\cdot \omega i \cdot Tmr}{P} - \frac{\sqrt{6}}{\pi}Efc \times a\right) + \sqrt{\left(\frac{2R1\cdot \omega i \cdot Tmr}{P} - \frac{\sqrt{6}}{\pi}Efc \times a\right)^2 - 4\left(\frac{R1^2+(\omega i - L1)^2}{M^2}\right)\left(\frac{R1^2+(\omega i \cdot L1 \cdot \sigma)^2}{k^2}\right)Tmr^2}}{2\frac{R1^2(\omega i - L1)^2}{M^2}}} \quad (13)$$

In this example, the circuit constants (i.e., R1, L1, M, L2, and P) of the induction motor 8 represented in the expression (13), the d-axis voltage command Vdr, the q-axis voltage command Vqr, the output angular frequency ωi, the filter capacitor voltage Efc, and the torque command value Tmr are input variables.

In the expression (13), a voltage of a certain value or higher which is applied to the induction motor 8 is ensured, and the modulation factor "a" is so determined as to avoid the unstable area shown in FIG. 4, thereby making it possible to reduce the unstable area at the time of low-speed operation.

That is, a lowest voltage Vm that is applied to the induction motor 8 is so set as to avoid the unstable area at the time of low-speed operation, to thereby determine the modulation factor "a" as represented by the expression (12).

The modulation factor "a" is substituted for the expression (13), thereby making it possible to obtain the magnetic flux command value F2RB as represented by the following expression (14).

[Eq. 14]

$$F2RB = \sqrt{\frac{-\left(\frac{2R1\cdot \omega i \cdot Tmr}{P} - \frac{\sqrt{6}}{\pi}Efc \times a\right) + \sqrt{\left(\frac{2R1\cdot \omega i \cdot Tmr}{P} - \frac{\sqrt{6}}{\pi}Efc \times a\right)^2 - 4\left(\frac{R1^2+(\omega i - L1)^2}{M^2}\right)\left(\frac{R1^2+(\omega i \cdot L1 \cdot \sigma)^2}{k^2}\right)Tmr^2}}{2\frac{R1^2(\omega i - L1)^2}{M^2}}} \quad (14)$$

The magnetic flux command value F2RB that is obtained by the expression (14) is used, thereby making it possible that the output voltage of the induction motor 8 ensures the set lowest voltage Vm even at the time of low-speed operation.

The rotor rotation angular frequency arithmetic section 17 is applicable regardless of the velocity estimating method such as the velocity estimating method using the adaptive observer senseless control.

In this example, the operation of the magnetic flux command value arithmetic means 11 will be described.

First, the comparator 22 compares the rotor rotation angular frequency setting value Wr12M that is set to the changeover setting value with the rotor rotation angular frequency Wr1.

In this example, in the case where the rotor rotation angular frequency Wr1 is lower than the rotor rotation angular frequency setting value Wr12M, the switch 23 changes to the magnetic flux command value back calculation arithmetic section 21 side. Then, F2RB that is calculated by the magnetic flux command value back calculation arithmetic section 21 is output as the magnetic flux command value.

Also, in the case where the rotor rotation angular frequency Wr1 is higher than the rotor rotation angular frequency setting value Wr12M, the switch 23 changes over to the magnetic flux command reference value F2RM side. Then, the magnetic flux command reference value F2RM is output as the magnetic flux command value.

In this situation, the voltage of the induction motor 8 with respect to the velocity becomes a value represented by a solid line of the graph in FIG. 5, and the lowest voltage Vm that is set as the lowest voltage that is applied to the induction motor 8 is output at the time of low-velocity operation which is lower than the rotor rotation angular frequency setting value Wr12M.

According to the vector control apparatus for an induction motor in the first embodiment of the present invention, the secondary magnetic flux command value F2RB that is calculated by determining the modulation factor "a" is used, thereby making it possible to ensure the lowest voltage Vm and increase the SN ratio of the output voltage even in the case where the rotation velocity of the induction motor 8 is low. For that reason, it is possible to suppress the arithmetic error of the primary angular frequency arithmetic value to a smaller value, and obtain the stable rotation even at the time of low-speed operation.

Also, because a value required to be calculated is only the modulation factor "a", it is possible to simplify the adjustment element and shorten the adjustment time.

Further, this embodiment is applicable regardless of the velocity estimating method, the unstable area can be avoided at the time of low-speed operation, and the adjusting method can be reduced.

Second Embodiment

In the above first embodiment, in the magnetic flux command value arithmetic means, the magnetic flux command is changed over taking only the rotor rotation angular frequency into consideration. Further, the brake command can be taken into consideration.

The second embodiment is made by adding means for switching the magnetic flux command value according to the brake command to the first embodiment.

Figure 6:
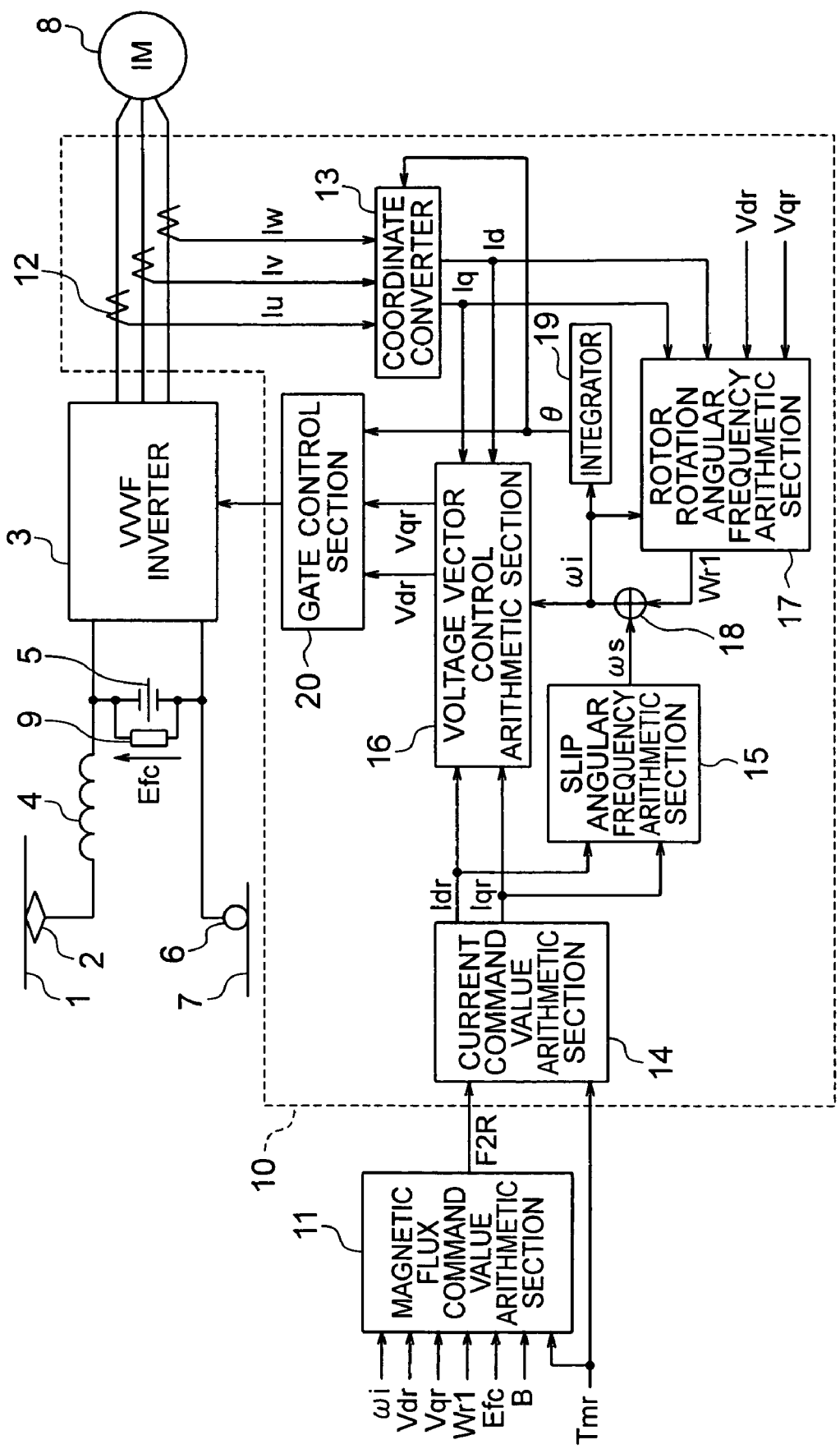
[FIG. 6] A block diagram showing a device configuration including a vector control apparatus for an induction motor according to a second embodiment of the present invention (a second embodiment)

FIG. 6 is a block diagram showing a device configuration including a vector control apparatus for an induction motor according to a second embodiment of the present invention.

Referring to FIG. 6, a brake command B is input to a magnetic flux command value arithmetic means 11 in the vector control apparatus. Other configurations are identical with those in the first embodiment, and their description will be omitted.

Figure 7:
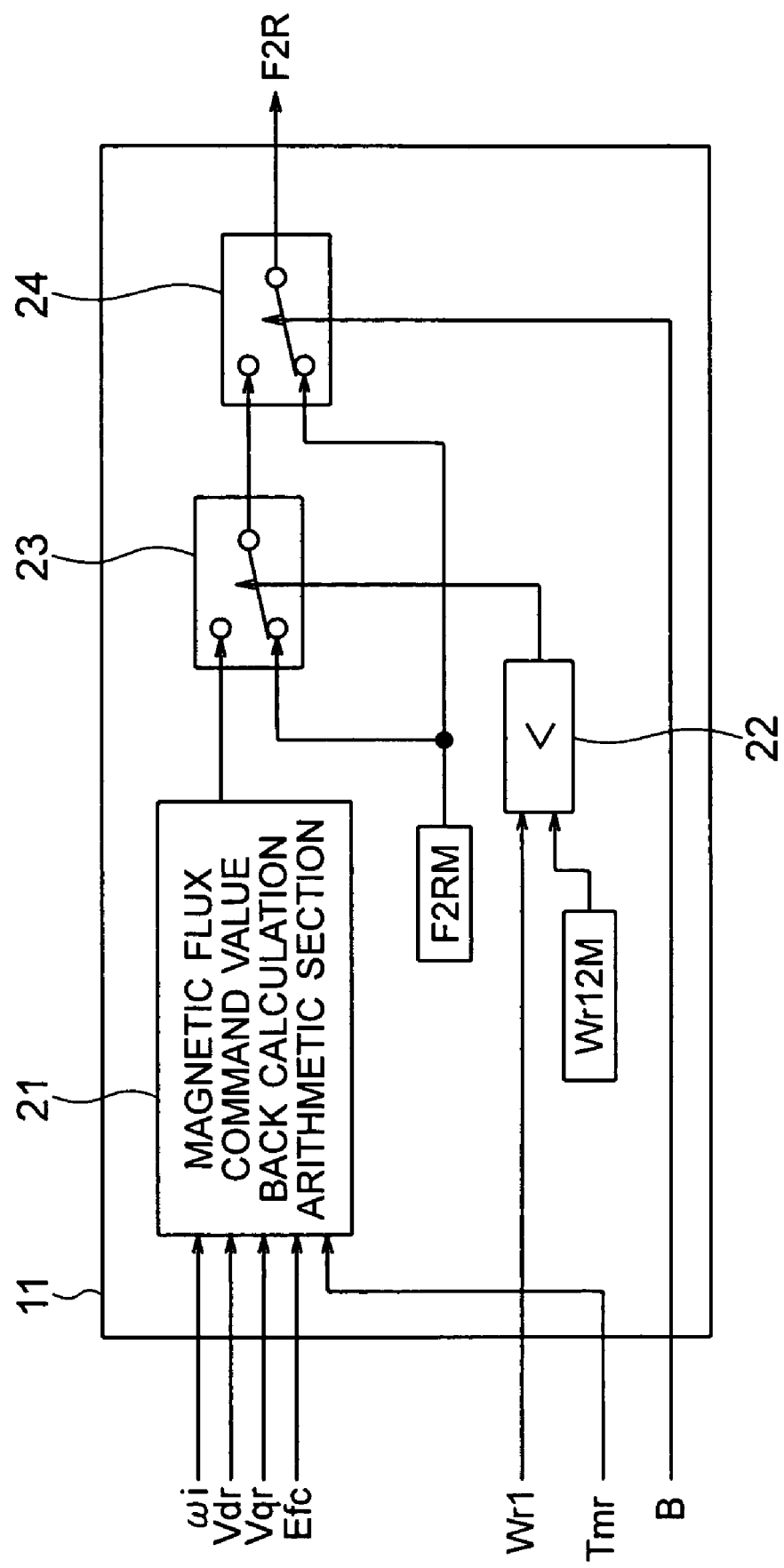
[FIG. 7] A block diagram showing magnetic flux command value arithmetic means in the vector control apparatus for an induction motor shown in FIG. 6 (the second embodiment).

FIG. 7 is a block diagram showing the magnetic flux command value arithmetic means 11 in the vector control apparatus for an induction motor shown in FIG. 6.

Referring to FIG. 7, the magnetic flux command value arithmetic means 11 includes a switch 24 that is a second magnetic flux command switch means. Other configurations are identical with those in the first embodiment, and their description will be omitted.

Hereinafter, a description will be given of the operation of the vector control apparatus for an induction motor structured as described above.

First, the vector control means 10 has the same operation as that of the first embodiment independent of the brake command, and their description will be omitted.

In the magnetic flux command value arithmetic means 11, the switch 24 conducts the same operation as that in the first embodiment only when the brake command B is generated, and conducts the switching so as to always output the magnetic flux command reference value F2RM when the brake command B is not generated.

According to the vector control apparatus for an induction motor in the second embodiment of the present invention, in general, the unstable area at the time of low-speed operation is generated only at the time of braking, and the magnetic flux command value back calculation arithmetic section 21 is operated only at the time of braking, so it is possible to separate the brake function and the power running function from each other.

In the first embodiment and the second embodiment, the example of the electric vehicle control apparatus using the velocity sensorless vector control is described as the purpose of the present invention. However, the present invention can be used in other general-purpose inverters or the field of the electric vehicle.

The invention claimed is:

1. A vector control apparatus for driving an induction motor through an inverter device, comprising:
   magnetic flux command value arithmetic means for selecting and outputting a magnetic flux command value on the basis of a torque command value that is calculated by a torque command value arithmetic section on the basis of an input signal from an external system, a circuit constant of the induction motor, and an actual measurement related to the induction motor; and
   vector control means for controlling the inverter device on the basis of the magnetic flux command value that is output from the magnetic flux command value arithmetic means and the circuit constant of the induction motor,
   wherein the magnetic flux command value arithmetic means includes a magnetic flux command value back calculation arithmetic section for calculating a magnetic flux command arithmetic value so that a voltage that is applied to the induction motor becomes equal to or higher than a setting value corresponding to an unstable area.

2. The vector control apparatus for an induction motor according to claim 1, wherein:
   the actual measurement includes a primary current of the induction motor, and a capacitor voltage of a capacitor that is connected to a DC side of the inverter device;
   the vector control means obtains a voltage command value, and a slip angular frequency and a rotor rotation angular frequency of the induction motor from the circuit constant and the primary current, and adds the slip angular frequency and the rotor rotation angular frequency to obtain an output angular frequency; and
   the magnetic flux command value back calculation arithmetic section calculates the magnetic flux command arithmetic value from the voltage command value, the output angular frequency, the capacitor voltage, and the torque command value.

3. The vector control apparatus for an induction motor according to claim 1 wherein:
   the vector control means obtains the rotor rotation angular frequency of the induction motor from the circuit constant and the primary current;
   the magnetic flux command value arithmetic means includes first magnetic flux command switch means based on the rotor rotation angular frequency; and
   the first magnetic flux command switch means outputs the magnetic flux command arithmetic value as the magnetic flux command value when the rotor rotation angular frequency is equal to or lower than a given frequency, and outputs a magnetic flux command reference value that is provided to the magnetic flux command value arithmetic means as the magnetic flux command value.

4. The vector control apparatus for an induction motor according to claim 1, wherein:
   the magnetic flux command value arithmetic means includes a second magnetic flux command switch means responsive to the brake command; and
   the second magnetic flux command switch means outputs the magnetic flux command arithmetic value as the magnetic flux command value when the brake command is generated, and outputs the magnetic flux command reference value that is provided to the magnetic flux command value arithmetic means as the magnetic flux command value when the brake command is not generated.

5. The vector control apparatus for an induction motor according to claim 2, wherein:

the vector control means obtains the rotor rotation angular frequency of the induction motor from the circuit constant and the primary current;

the magnetic flux command value arithmetic means includes first magnetic flux command switch means based on the rotor rotation angular frequency; and the first magnetic flux command switch means outputs the magnetic flux command arithmetic value as the magnetic flux command value when the rotor rotation angular frequency is equal to or lower than a given frequency, and outputs a magnetic flux command reference value that is provided to the magnetic flux command value arithmetic means as the magnetic flux command value.

6. The vector control apparatus for an induction motor according to claim 2, wherein:

the magnetic flux command value arithmetic means includes a second magnetic flux command switch means responsive to the brake command; and the second magnetic flux command switch means outputs the magnetic flux command arithmetic value as the magnetic flux command value when the brake command is generated, and outputs the magnetic flux command reference value that is provided to the magnetic flux command value arithmetic means as the magnetic flux command value when the brake command is not generated.

7. The vector control apparatus for an induction motor according to claim 3, wherein:

the magnetic flux command value arithmetic means includes a second magnetic flux command switch means responsive to the brake command; and the second magnetic flux command switch means outputs the magnetic flux command arithmetic value as the magnetic flux command value when the brake command is generated, and outputs the magnetic flux command reference value that is provided to the magnetic flux command value arithmetic means as the magnetic flux command value when the brake command is not generated.

* * * * *